(12) United States Patent
Burton

(10) Patent No.: US 7,845,837 B2
(45) Date of Patent: Dec. 7, 2010

(54) PUSH-IN SOCKET ASSEMBLY

(75) Inventor: John Burton, Ludington, MI (US)

(73) Assignee: Burton Technologies, LLC, Ludington, MI (US)

( * ) Notice: Subject to any disclaimer, the term of this patent is extended or adjusted under 35 U.S.C. 154(b) by 287 days.

(21) Appl. No.: 12/100,607

(22) Filed: Apr. 10, 2008

(65) Prior Publication Data

US 2009/0257239 A1    Oct. 15, 2009

(51) Int. Cl.
*F21V 14/04*    (2006.01)
*F16C 23/00*    (2006.01)

(52) U.S. Cl. .................... 362/515; 362/528; 362/421; 384/210

(58) Field of Classification Search .............. 362/515, 362/528, 421; 384/210, 903; 403/135
See application file for complete search history.

(56) References Cited

U.S. PATENT DOCUMENTS

| | | | |
|---|---|---|---|
| 3,006,673 A | 10/1961 | Swick | |
| 3,139,768 A | 7/1964 | Biesecker | |
| 3,173,266 A | 3/1965 | Shutt | |
| 3,483,888 A | 12/1969 | Wurzel | |
| 3,700,295 A * | 10/1972 | Butzow et al. | 384/210 |
| 4,194,850 A | 3/1980 | Cranmore | |
| 4,503,486 A | 3/1985 | Makita | |
| 4,689,725 A | 8/1987 | Saijo et al. | |
| 5,045,987 A | 9/1991 | Hebert | |
| 5,095,411 A | 3/1992 | Peck et al. | |
| 5,186,531 A | 2/1993 | Ryder et al. | |
| 5,186,532 A | 2/1993 | Ryder et al. | |
| 5,360,282 A | 11/1994 | Nagengast et al. | |
| 5,444,603 A | 8/1995 | Otsuka et al. | |
| 5,526,238 A * | 6/1996 | Van Oel et al. | 362/528 |
| 5,642,935 A * | 7/1997 | Schmitt | 362/528 |
| 5,673,992 A | 10/1997 | Schmitt | |
| 5,707,133 A | 1/1998 | Burton | |
| 5,741,059 A * | 4/1998 | Kusagaya | 362/524 |
| 5,833,347 A | 11/1998 | Nakamura et al. | |
| 6,113,301 A | 9/2000 | Burton | |
| 6,231,223 B1 | 5/2001 | Zucar et al. | |
| 6,247,868 B1 | 6/2001 | Burton | |
| 6,485,218 B1 | 11/2002 | Martinovsky | |
| 6,612,796 B2 | 9/2003 | Gattone | |
| 6,692,176 B1 | 2/2004 | Fladhammer | |
| 6,758,622 B2 | 7/2004 | Burton | |

(Continued)

OTHER PUBLICATIONS

Tinnerman, photos of standard cap nut fasteners, sold prior to 2007.

(Continued)

*Primary Examiner*—Stephen F. Husar
*Assistant Examiner*—Peggy A. Neils
(74) *Attorney, Agent, or Firm*—Jennifer R. Racine; Godfrey & Kahn, S.C.

(57) ABSTRACT

A ball socket for connection with a ball stud provides for easy manufacturing and assembly using a flat-stamped flexible retainer clip. The retainer clip is inserted into the socket and flexes to snap-fit within in the socket. The flex of the clip also flexes wings of the clip which engage with a receiving boss or socket. The flexion of the clip allows for easy push-in of the socket and sufficient resistance to accidental pull-out. The push-in socket design eliminates the need for screw-mounting of the socket. The socket assembly may be manufactured for use in connection with disengageable or conventional ball studs.

16 Claims, 12 Drawing Sheets

U.S. PATENT DOCUMENTS

| | | | |
|---|---|---|---|
| 6,783,314 B2 | 8/2004 | Gattone | |
| 6,813,991 B2 | 11/2004 | Koth | |
| 6,837,716 B1 | 1/2005 | Brazas | |
| 6,945,682 B2 | 9/2005 | Cramer et al. | |
| 6,971,777 B2 * | 12/2005 | Casses et al. | 362/515 |
| 6,976,773 B2 | 12/2005 | Cavanna | |
| 7,047,868 B2 | 5/2006 | Nolan et al. | |
| 2003/0235057 A1 * | 12/2003 | Drews et al. | 362/515 |
| 2008/0138151 A1 | 6/2008 | Schilz et al. | |

OTHER PUBLICATIONS

Dec. 18, 2009, Office Action in related U.S. Appl. No. 12/114,591.
Jun. 25, 2009, Office Action in related U.S. Appl. No. 12/114,591.
Valeo; drawing of Valeo socket; in production circa 2006.
Burton; drawing of Burton Technologies socket; circa 2005.
Final Office Action issued Mar. 22, 2010, for U.S. Appl. No. 12/144,591.
Office Action issued Jun. 17, 2010, for U.S. Appl. No. 12/114,591.

* cited by examiner

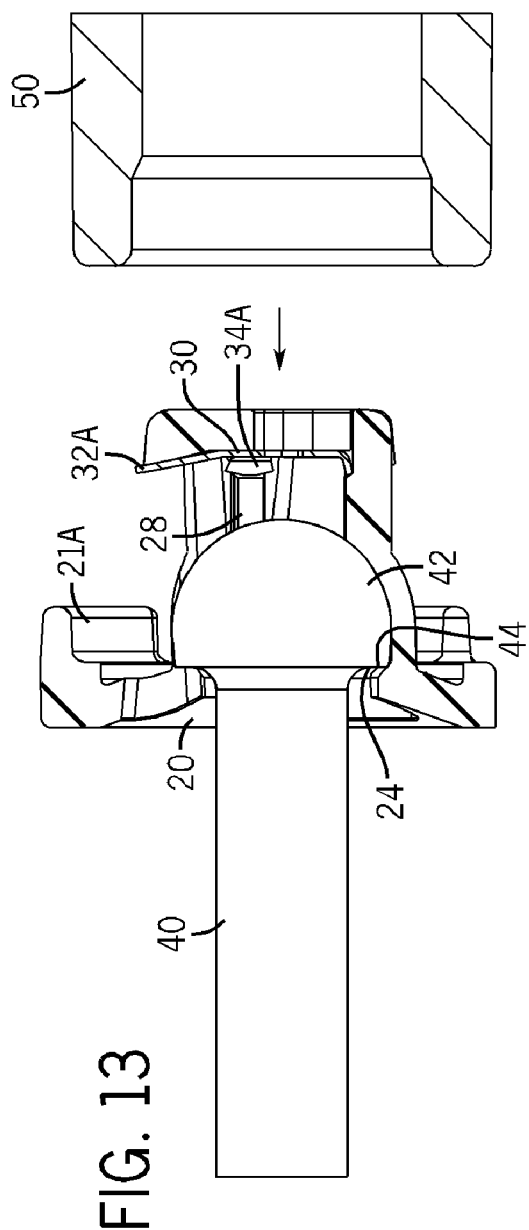
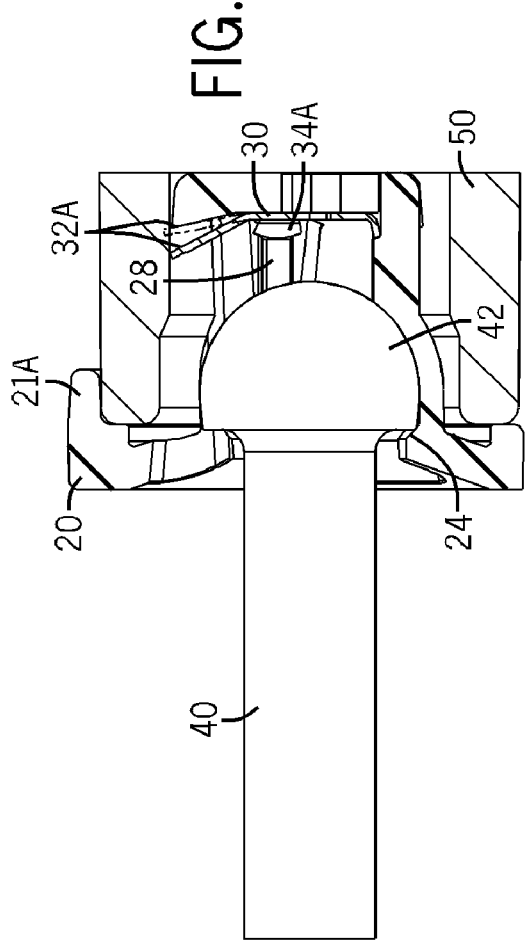

PUSH-IN SOCKET ASSEMBLY

BACKGROUND OF THE INVENTION

This invention relates generally to pivot joints, and in particular to a pivot joint useful for connecting a headlamp adjustor to a reflector inside a headlamp assembly or an external reflector and lens headlamp assembly. The improved socket assembly can be used effectively with many types of ball studs, including disengageable ball studs or conventional spherical, semi-spherical or "eared" ball studs.

Pivotable spherical joints, commonly referred to as ball joints, include a ball stud engaged in a socket. Such joints have a wide variety of applications where a pivotable connection between two parts is desirable. For example, they may be used in many types of linear actuators and have been found to be particularly useful in automotive lamp assemblies. As seen in U.S. Pat. No. 5,707,133, automotive lamp assemblies used as headlights typically comprise several basic parts: a support frame, a reflector, a lens, a bulb, and one or more adjusters.

In the automotive lamp assembly example, the support frame houses the reflector and the bulb on a pivotable mounting to allow the aim of the light to be adjusted using the adjuster. The lens seals the front of the assembly to protect it from the elements assailing the front end of the vehicle and provides an aerodynamic shape and attractive appearance. The reflector mounts inside the housing on one fixed ball joint and is adjustable horizontally and vertically using adjusters that interface with the reflector through moving ball joints. The moving ball joints are moveable by actuating the adjusters connected to the moving ball joints by a ball stud having a head and a shaft. Another type of automotive headlamp assembly that uses linear actuators is shown in U.S. Pat. No. 5,360,282. In this type of headlamp assembly the linear actuator is mounted to a bracket and the ball joint end supports a reflector, lens and light bulbs. This type of application requires a higher strength ball joint due to the additional weight being supported. In particular, pull-out strength of the ball joint needs to be greater to withstand vibration. A socket design such as those in U.S. Pat. Nos. 6,692,176 and 6,758,622 provide improved socket designs to resist accidental pull-out of the ball stud.

While one possible application of the present invention is in headlamp assemblies, other applications are possible and references to use in a headlamp assembly should not be deemed to limit the application of the present invention. Conventional ball joints for use in automotive lamp assemblies typically include a ball stud with a spherical engagement head extending from an adjuster. The ball stud is moveable linearly in and out of the adjuster. Examples of such ball studs and corresponding sockets are shown in U.S. Pat. Nos. 4,689,725; 5,673,992; 5,095,411; and 5,186,532. Additionally, while the improved ball socket design described herein may be used with ball studs having "ears" or engaging tabs or semi-spherical ball stud designs (such as those disclosed in U.S. Pat. Nos. 4,689,725 and 5,186,531), a disengageable ball stud (such as those disclosed in U.S. Pat. Nos. 6,113,301 and 6,247,868), can also be used advantageously with the present invention.

As is known in the art, ball studs interface with a socket, typically plastic, such as the one shown in U.S. Pat. No. 6,837,716. Generally, the sockets are attached to the reflector such that movement of the ball stud effectuates movement of the reflector. For example, the socket is attached to a boss with a fastener, the boss having an aperture therein for receiving the fastener. Conventional sockets are secured to the reflector of the headlamp by either screwing the socket into the reflector by placing a screw through a screw hole in the reflector, like that in U.S. Pat. No. 6,247,868, or can be pushed into a through hole in the reflector and secured using tabs or panels which spring outward and "snap-fit" into the reflector hole, like that shown in U.S. Pat. No. 6,837,716. Another conventional socket like that shown in U.S. Pat. No. 6,231,223 is pushed into a blind hole and uses deformable fins to hold the socket inside by friction.

Several problems exist with installation of conventional sockets. For those requiring that the socket be screwed in, an additional assembly task is required by the manufacturer to place the screw into the socket, and during assembly of the headlamp, each socket must be individually screwed into each reflector. This requires extra time and cost in both manufacturing and installation. Conventional snap-in sockets also have a disadvantage in that a through hole is required for the snap fit fingers to work. Snap fit designs do not work in blind holes since a ledge inside the hole is needed for the snap feature. However, blind holes are often preferred over through holes for ease of manufacturing and tool design and maintenance. Through holes require the reflector molding tool to have a parting line surface within the through hole and often require the use of tool side action as well in order to mold the reflector. This adds complexity and cost to the tool design and construction. Also, added tool maintenance and quality control expense of the parting line surface is needed to prevent flash. Prior socket designs that are pushed into blind holes either have inadequate retention to prevent accidental pull out or require a very high force to install into the hole.

Accordingly, the need exists for a socket which can be inserted into a blind hole. A need also exists for a socket which can be inserted into a reflector fairly easily by hand without the extra force of a tool. A need also exists for a socket that resists accidental pull-out from the reflector. It is also desirable that such a socket be easily and cost-effectively manufactured and installed, and also that it can be used with any number of different types of ball studs.

SUMMARY OF THE INVENTION

The present invention provides a push-in socket that is cost-effective, easy to assemble, easily installed in a headlamp assembly by hand, can securely retain a ball stud of various types placed therein, and can be installed into a blind hole.

In accordance with the present invention, a push-in socket assembly is disclosed. The socket can be used with various types of ball studs, such as conventional ball studs of various shapes, or disengageable ball studs. The ball stud is inserted into the top portion of the socket. The top portion of the socket engages the head of the ball stud to prevent accidental separation from the socket, and is sized and shaped to allow the head of the ball stud to rotate within the socket chamber.

In a preferred embodiment, the top portion of the socket is also shaped to allow insertion of a retainer clip through the top portion and chamber of the socket. The top portion may also include a flat edge to aid with orientation of the socket in assembly and/or installation. A plurality of legs connects the top portion of the socket to the bottom portion. The legs include molded ledges which secure the retainer clip into the socket. The bottom portion of the socket is shaped to receive the retainer clip and to fit into a boss or aperture of a reflector in a headlamp assembly.

In a preferred embodiment, a flat-stamped symmetrical retainer clip is fit into a socket. As the clip is fully seated into the to the socket using hardened steel pins, the inner tabs on the clip bend into a more vertical position and hook behind ledges molded on the inner walls of the socket legs. At this point the outer wings are seated against a concave support base which causes the outer wings of the clip to flex into a more angled position relative to the original flat clip position. The flexion of the outer wings of the retainer clip when inserted into the socket and further flexion upon installation of the socket into the reflector boss of the headlamp allows the socket assembly to be inserted into the boss with relatively small push-in force, and provides the option of hand assembly. Further, accidental removal of the socket from the boss is prevented.

While one possible application of the present invention is in headlamp assemblies, many other applications are possible and references to use in a headlamp assembly should not be deemed to limit the uses of the present invention. The terms "clip," "tab," "wing," "notch" or "ledge" as used herein should not be interpreted as being limited to specific forms or shapes of retainer clips or sockets, or portions thereof. Rather, the socket, ball stud, retainer clip, and ledges of the socket, and tabs, wings and notches of the retainer clip in accordance with the present invention may have a wide variety of shapes. These and other objects and advantages of the present invention will become apparent from the detailed description and accompanying drawings.

BRIEF DESCRIPTION OF THE DRAWINGS

FIG. 13 is an exploded side view of a retainer clip, a socket and a ball stud for assembly into a reflector in accordance with one embodiment of the present invention; and FIG. 14 is a side view of a push-in socket assembly in accordance with one embodiment of the present invention.

DETAILED DESCRIPTION

Figure 1:
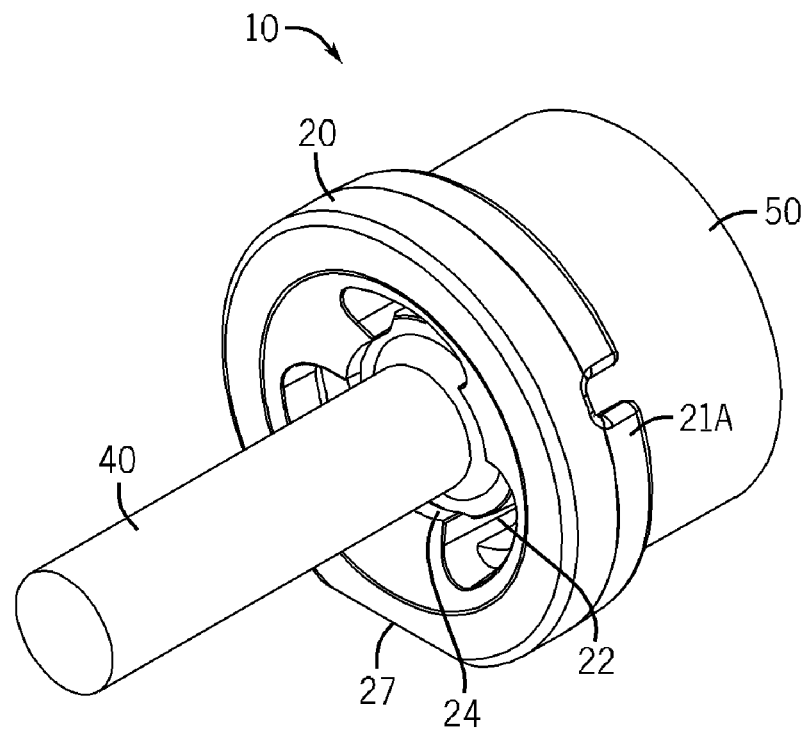
FIG. 1 is a front perspective view of a push-in socket assembly in accordance with one embodiment of the present invention.

Certain embodiments of a push-in socket assembly 10 in accordance with the present invention as shown in the FIGURES. While the invention may be susceptible to embodiment in different forms, there is shown in the drawings, and herein will be described in detail, certain illustrative embodiments with the understanding that the present disclosure is to be considered an exemplification of the principles of the invention, and is not intended to limit the invention to those as illustrated and described herein. Additionally, features illustrated and described with respect to one embodiment could be used in connection with other embodiments.

Figure 2:
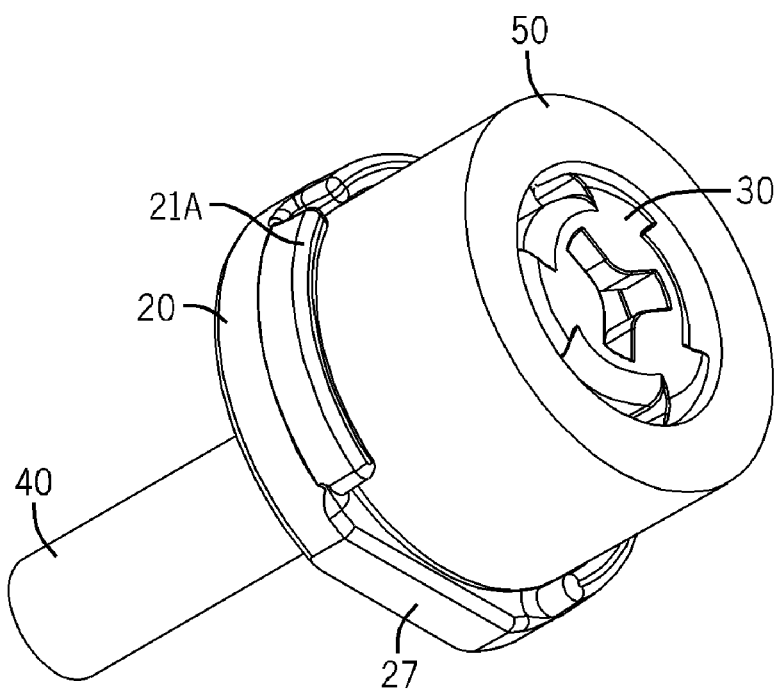
FIG. 2 is a rear perspective view of a push-in socket assembly in accordance with one embodiment of the present invention.
Figure 3:
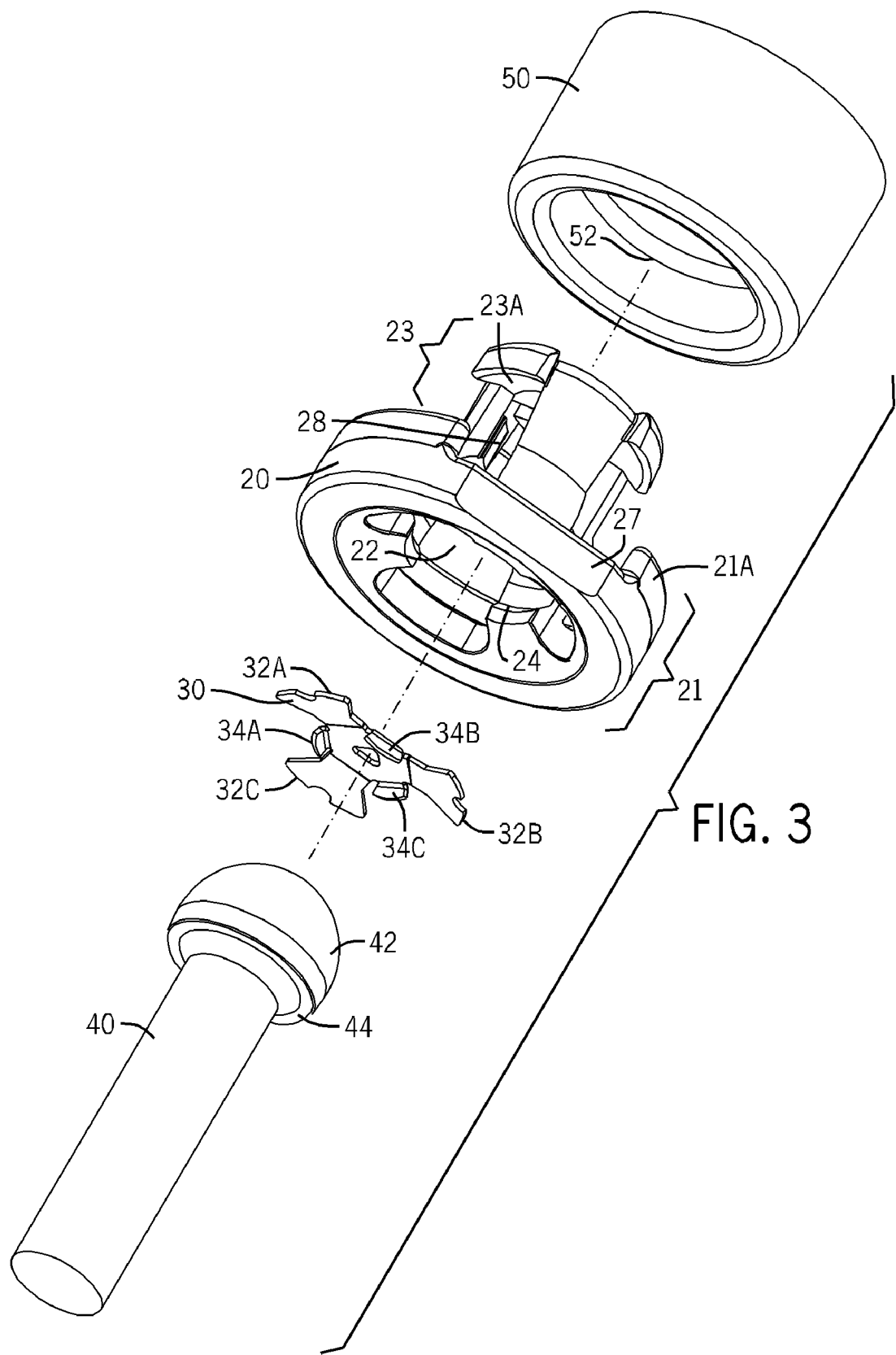
FIG. 3 is an exploded perspective view of a push-in socket assembly in accordance with one embodiment of the present invention.

An improved push-in socket assembly 10 is shown in FIGS. 1-3. The assembly 10 consists of a socket 20 and a retainer clip 30. Socket assembly 10 can be used with conventional ball studs of various shapes or disengageable ball studs. In the embodiment shown in the figures, a semi-spherical ball stud 40 with a lip 44 on the head 42 of the ball stud 40 is used, but top portion of socket 21 could be easily modified to accept various types of ball studs known to those skilled in the art, such as spherical, disengageable, or "eared" ball studs. In the embodiment shown in the FIGURES, socket 20 retains ball stud 40 therein by providing undercut portions 24 which engage or "snap-fit" with the lip 44 on ball stud 40 and secures the head 42 of ball stud 40 by snap-fitting into socket 20. The diameter of undercut portion 24 is smaller than the diameter of the lip 44 of the ball stud head 42. Thus, ball stud 40 cannot be easily dislodged or separated from socket 20, but is still allowed to rotate inside chamber 22 because chamber 22 is slightly larger than the head 42. Ball stud 40 is shown in detail in FIG. 3A and, in this embodiment of a ball stud, the lip 44 is formed by a straight portion 43 extending past the curved ball stud head 42.

Figure 1A:
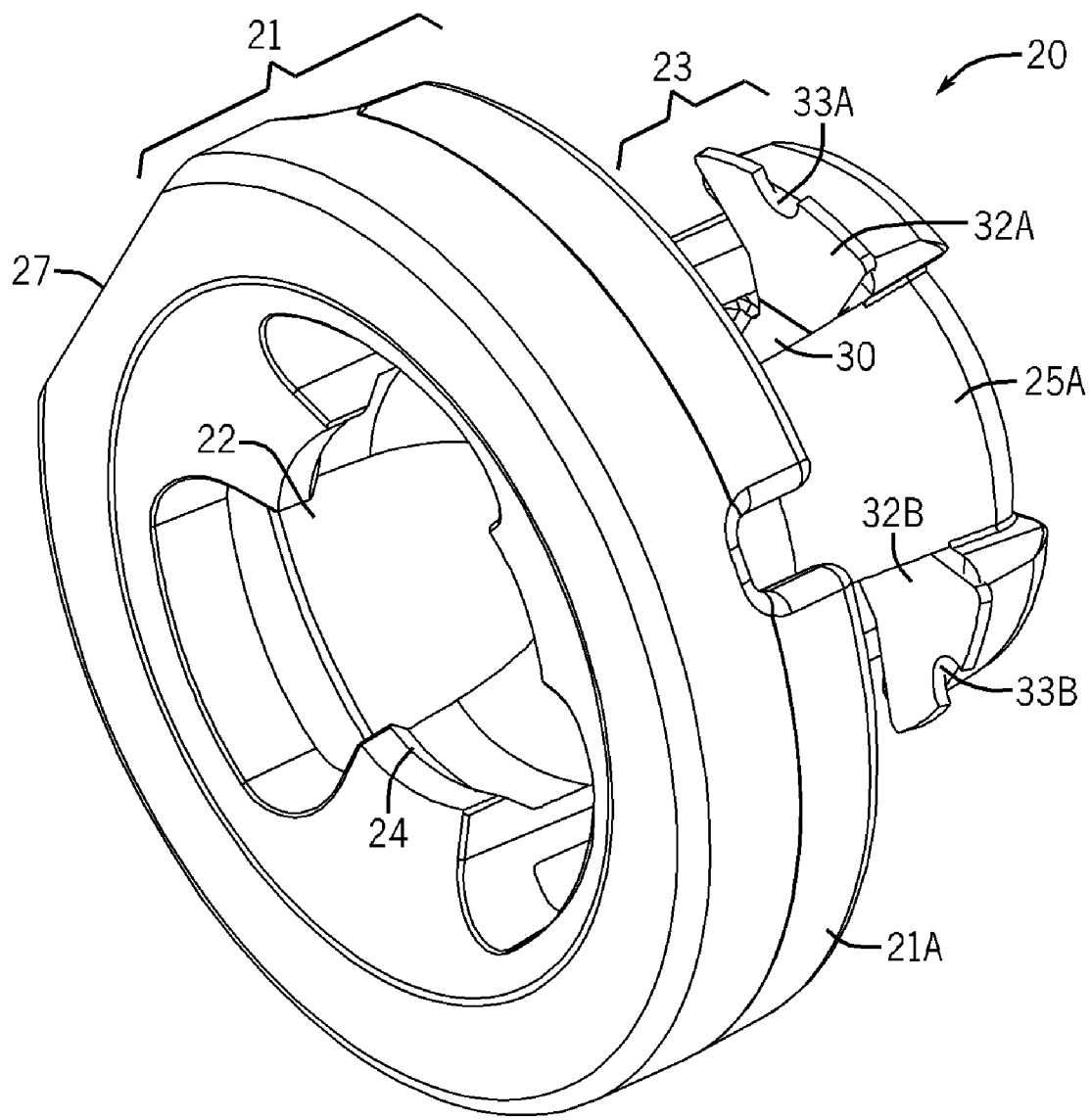
FIG. 1A is a front perspective view of a push-in socket assembly in accordance with one embodiment of the present invention.
Figure 2A:
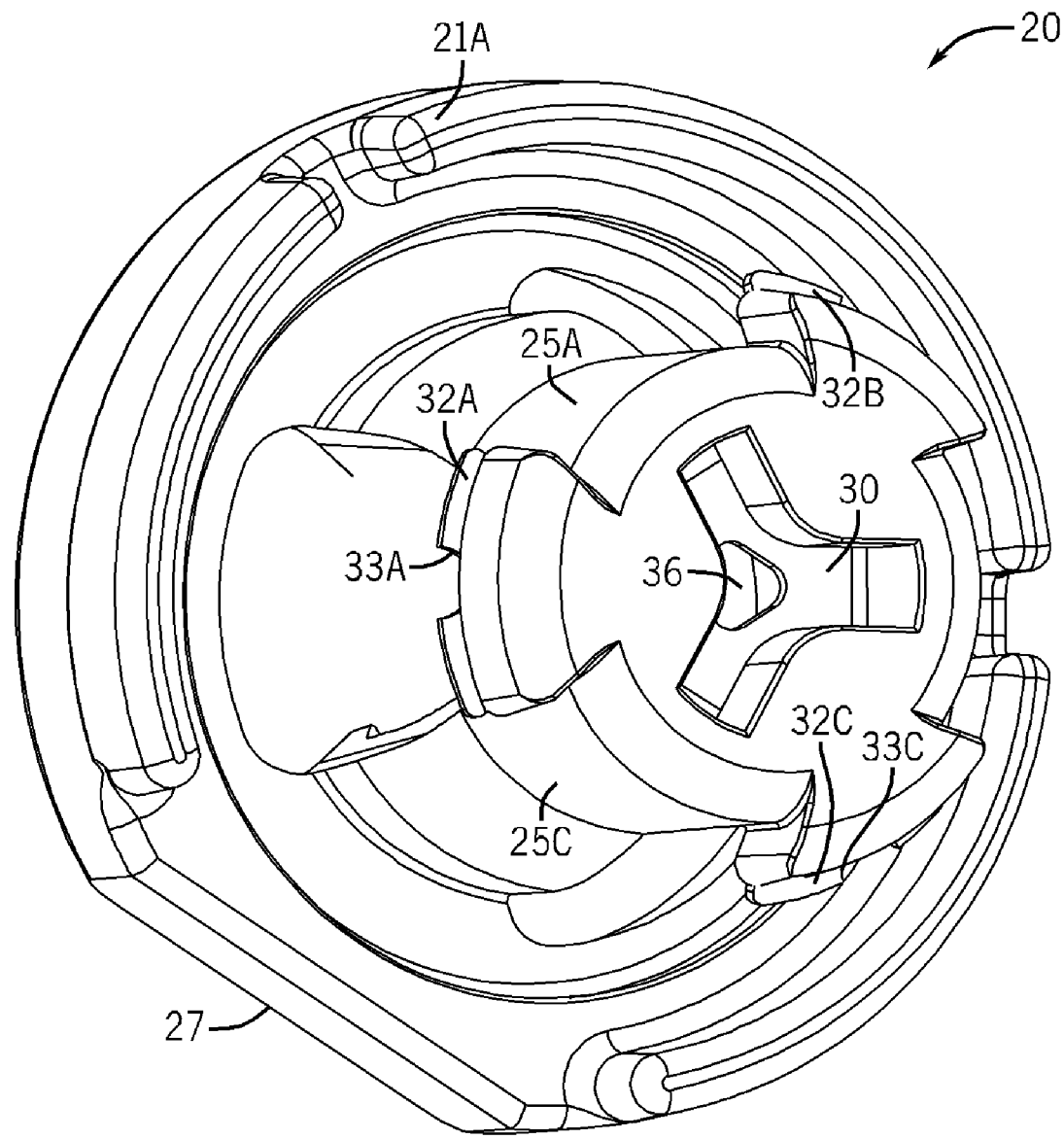
FIG. 2A is a rear perspective view of a push-in socket assembly in accordance with one embodiment of the present invention.
Figure 10:
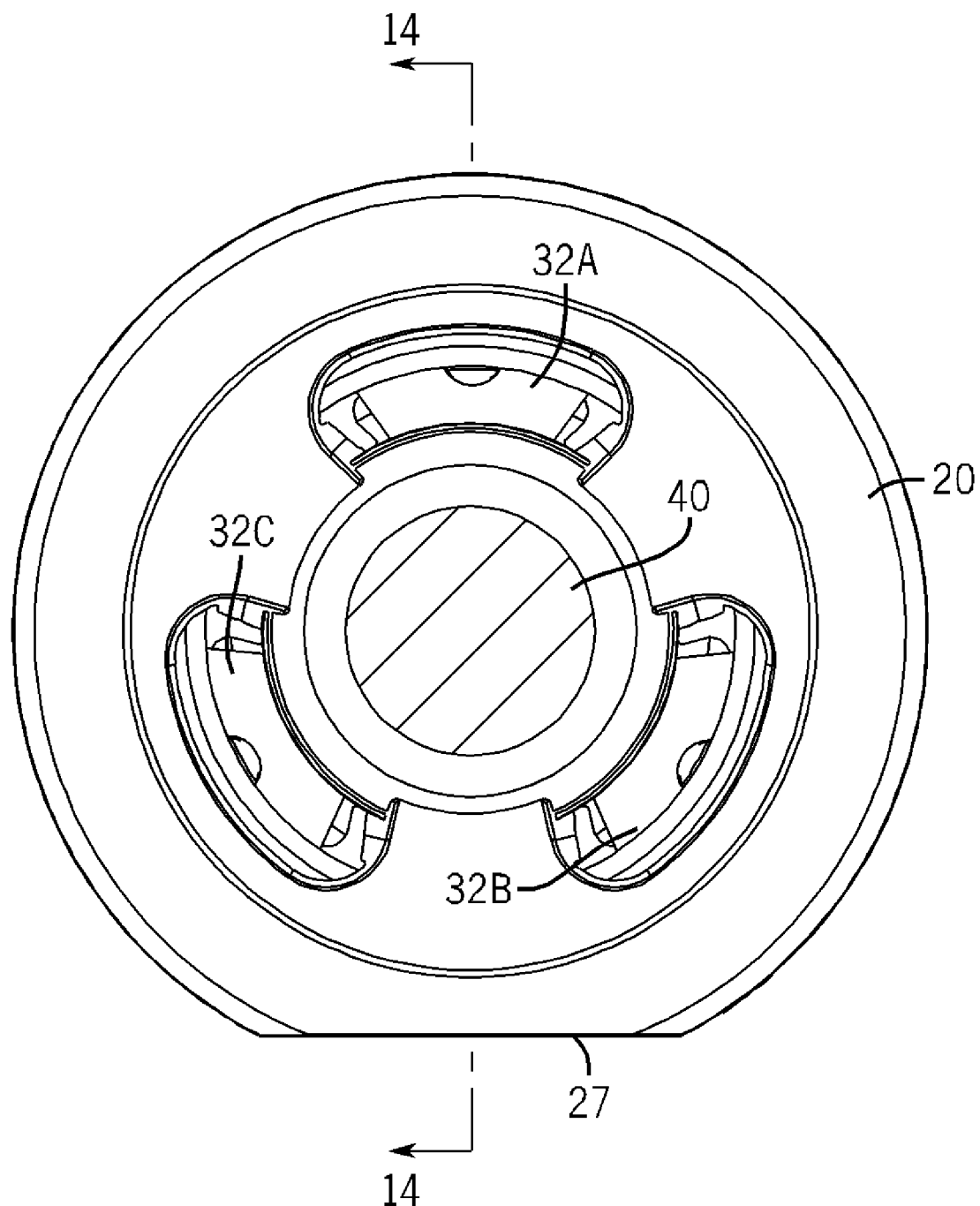
FIG. 10 is a top view of one embodiment of a push-in socket assembly in accordance with one embodiment of the present invention.
Figure 11:
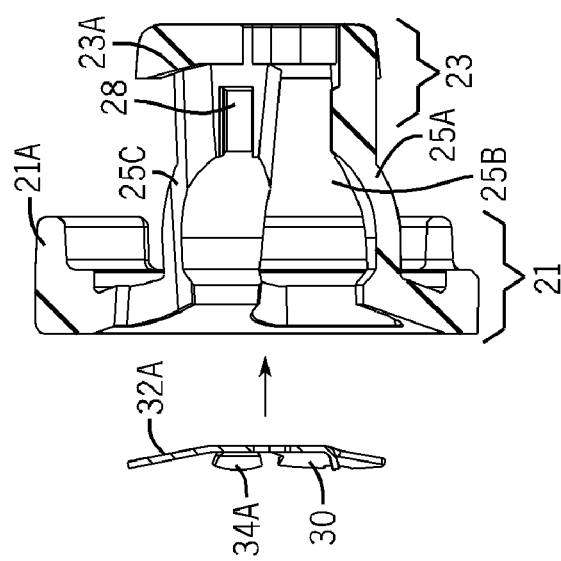
FIG. 11 is an exploded side view of a retainer clip and a socket in accordance with one embodiment of the present invention.

As best seen in FIGS. 3 and 11-13, socket 20 has a top portion 21 into which a ball stud head 42 is inserted. As seen in FIGS. 1A and 3, the top portion 21 is shaped to allow the three wings 32A, 32B and 32C of the retainer clip 30 to pass through for insertion into the bottom portion 23 of the socket 20. As seen in FIGS. 1A, 2A and 10, the generally circular top portion 21 may include a flat edge 27. The flat edge 27 may be used to orientate the socket 20 during assembly of the socket assembly 10, or to aid in orientation during assembly into the reflector boss 50. However, the flat edge 27 is an optional feature, and the top portion 21 may also be a complete circle (or other alternate shape such as a square). Top portion 21 also includes a flange 21A to surrounds the outside of the reflector boss 50 to secure the top of the socket 20 to the boss 50 while allowing clearance for the legs 25A, 25B, 25C to expand inside the boss hole 52 as the ball stud 40 is installed into the socket 20. It also has a generally circular bottom portion 23 which is inserted into a generally circular reflector boss 50. However, the shape of the bottom portion of the 23 of the socket 20 could be modified to fit into bosses of different shapes, e.g. square-shaped bosses. Bottom portion 23 also includes a concave support surface which, when inserted into socket 20, also angles and supports the wings 32A, 32B, 32C to resist buckling if pull out is attempted. In the embodiment shown, socket 20 includes three legs 25A, 25B, 25C connecting the top portion 21 and bottom portion 23 of the socket 20. The legs 25A, 25B, 25C may be curved outward near the top portion 21 of the socket 20 to allow movement of the ball stud head 42 once inserted into the socket 20. Socket 20 is preferably made of a plastic material, such as Acetal, but other materials could be used.

Figure 4:
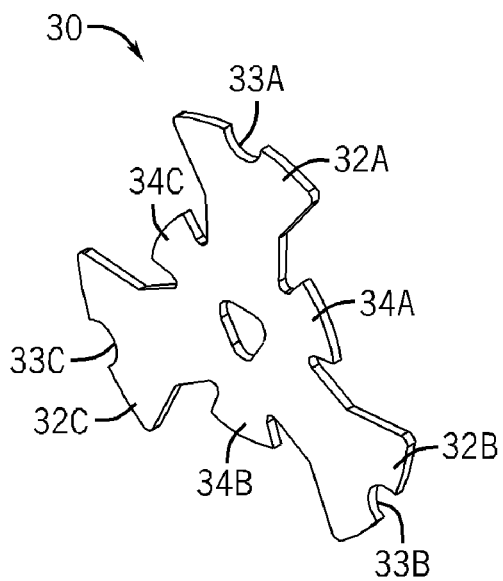
FIG. 4 is a perspective view of one embodiment of a retainer clip in a flat position in accordance with one embodiment of the present invention.
Figure 5:
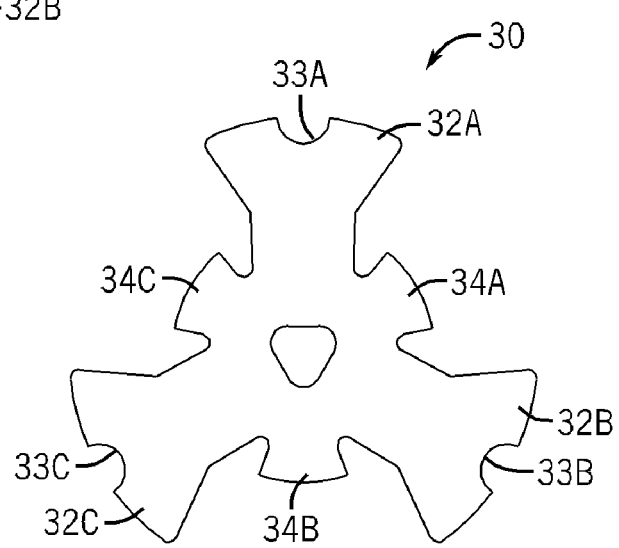
FIG. 5 is a front view of one embodiment of a retainer clip in a flat position in accordance with one embodiment of the present invention.
Figure 6:
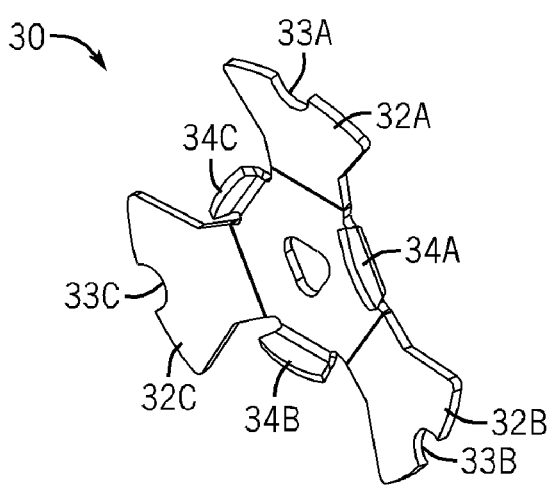
FIG. 6 is a perspective view of one embodiment of a retainer clip in a flexed position in accordance with one embodiment of the present invention.

As seen in FIGS. 4-6, retainer clip 30 is a symmetrical design includes three outer wings 32A, 32B, 32C and three inner tabs 34A, 34B, 34C. As seen in FIGS. 4 and 5, clip 30 is stamped as a single, flat piece, which is cost-effective and saves time in the manufacturing of the push-in socket assembly 10. Additionally, the clip 30 can be placed into the socket 20 in any direction—that is, the there is no "face up" or "face down" distinction or specific rotational orientation necessary for clip 20 insertion. This saves time in the assembly process, as the person or machine assembling the push-in socket assembly 10 does not have to ensure that the clip 20 is facing a particular way for installation into the socket 20. Retainer clip is generally made of a semi-rigid metal—fully hardened 301 stainless steel has been found effective but other materials could also be used. This allows for bending or flexion of the wings 32A, 32B, 32C and tabs 34A, 34B, 34C when the clip 30 is inserted into the socket 20 (as seen in FIG. 6). The wings 32A, 32B, 32C of the clip 30 also each include a semicircular notch 33A, 33B, 33C, the sharp corners of which act to bite into the side walls of the reflector boss 50 when the socket assembly is 10 is assembled into the boss 50.

Figure 7:
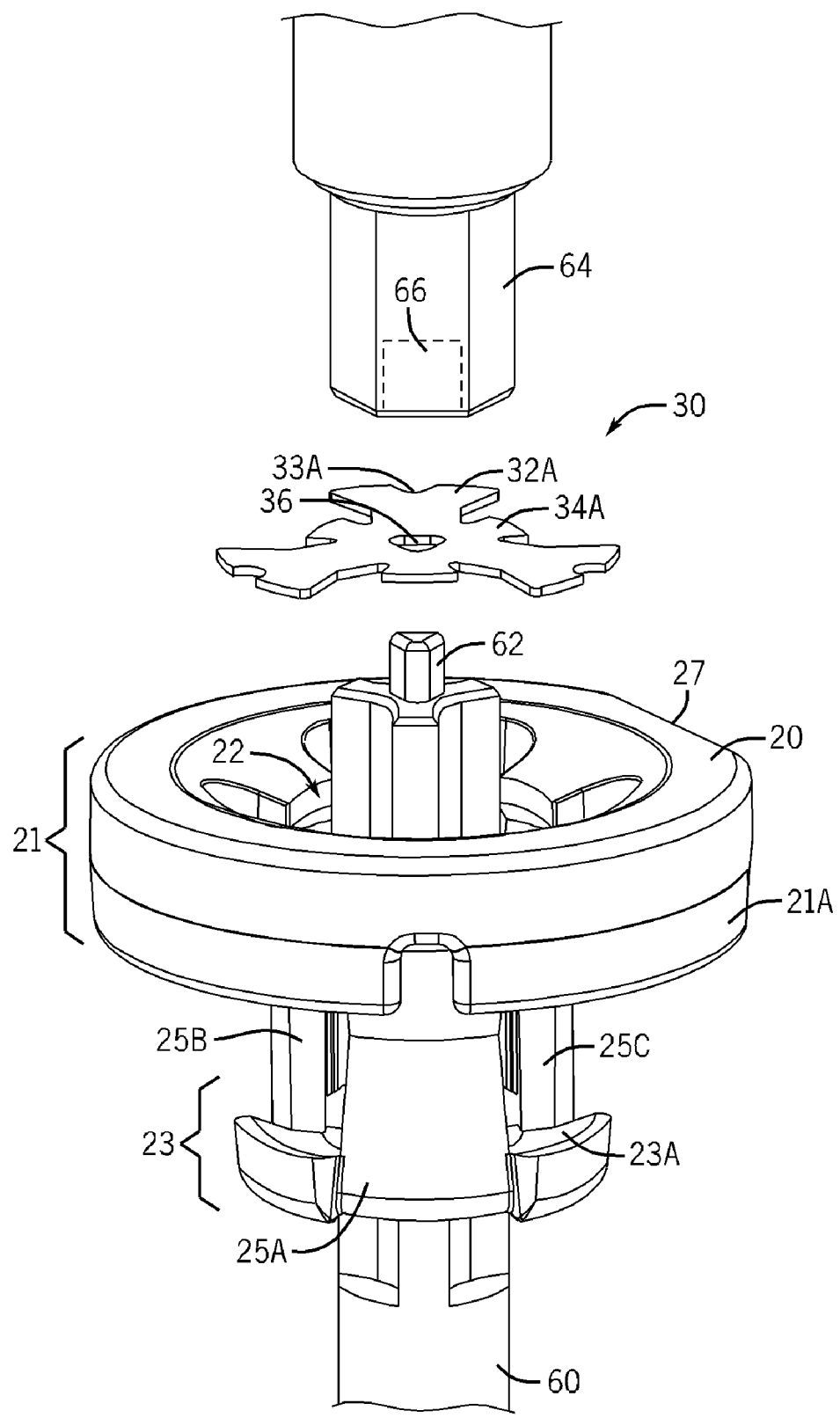
FIG. 7 is an exploded side view showing assembly of a retainer clip into a socket in accordance with one embodiment of the present invention.
Figure 8:
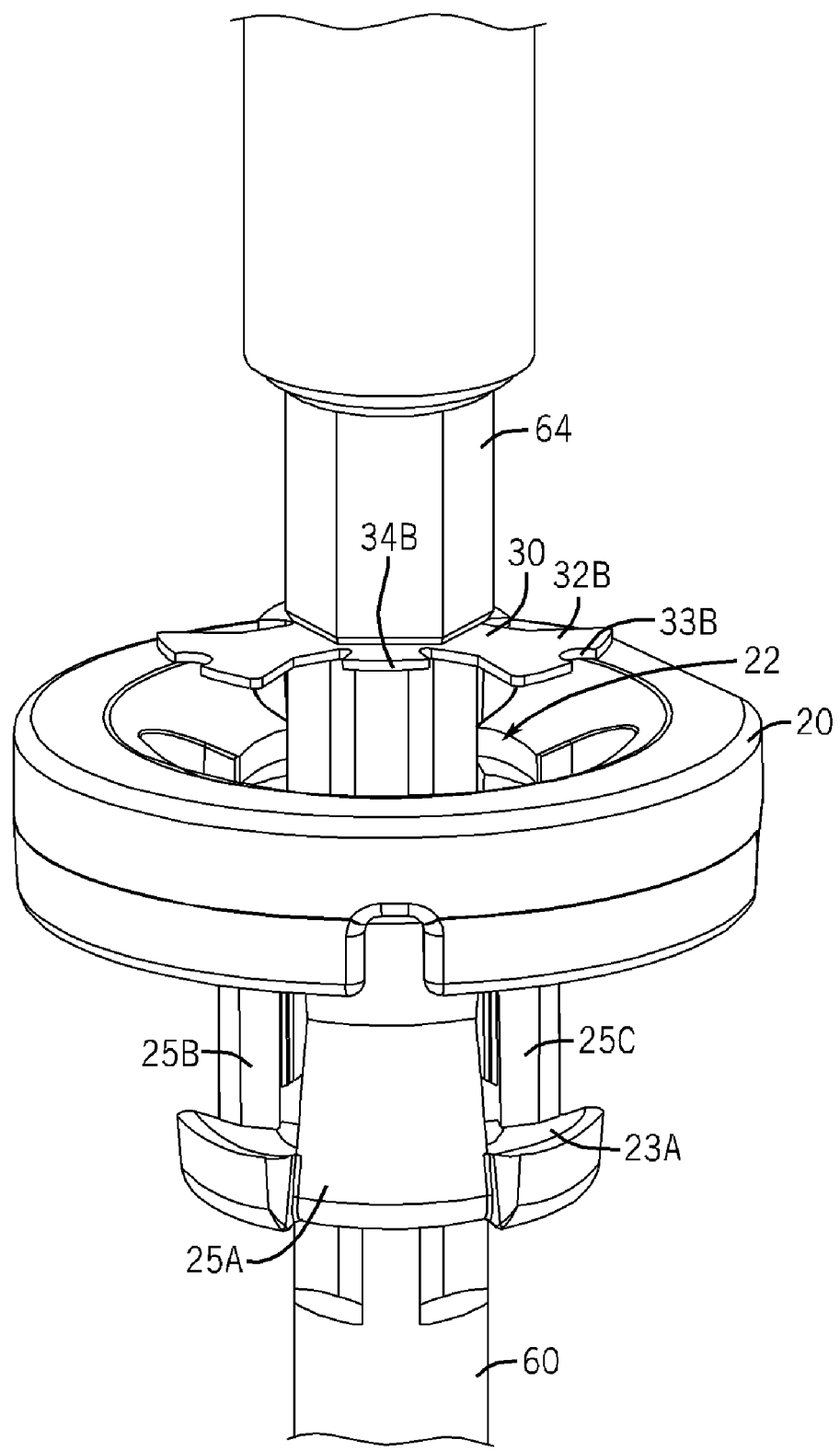
FIG. 8 is a side view showing assembly of a retainer clip into a socket in accordance with one embodiment of the present invention.
Figure 9:
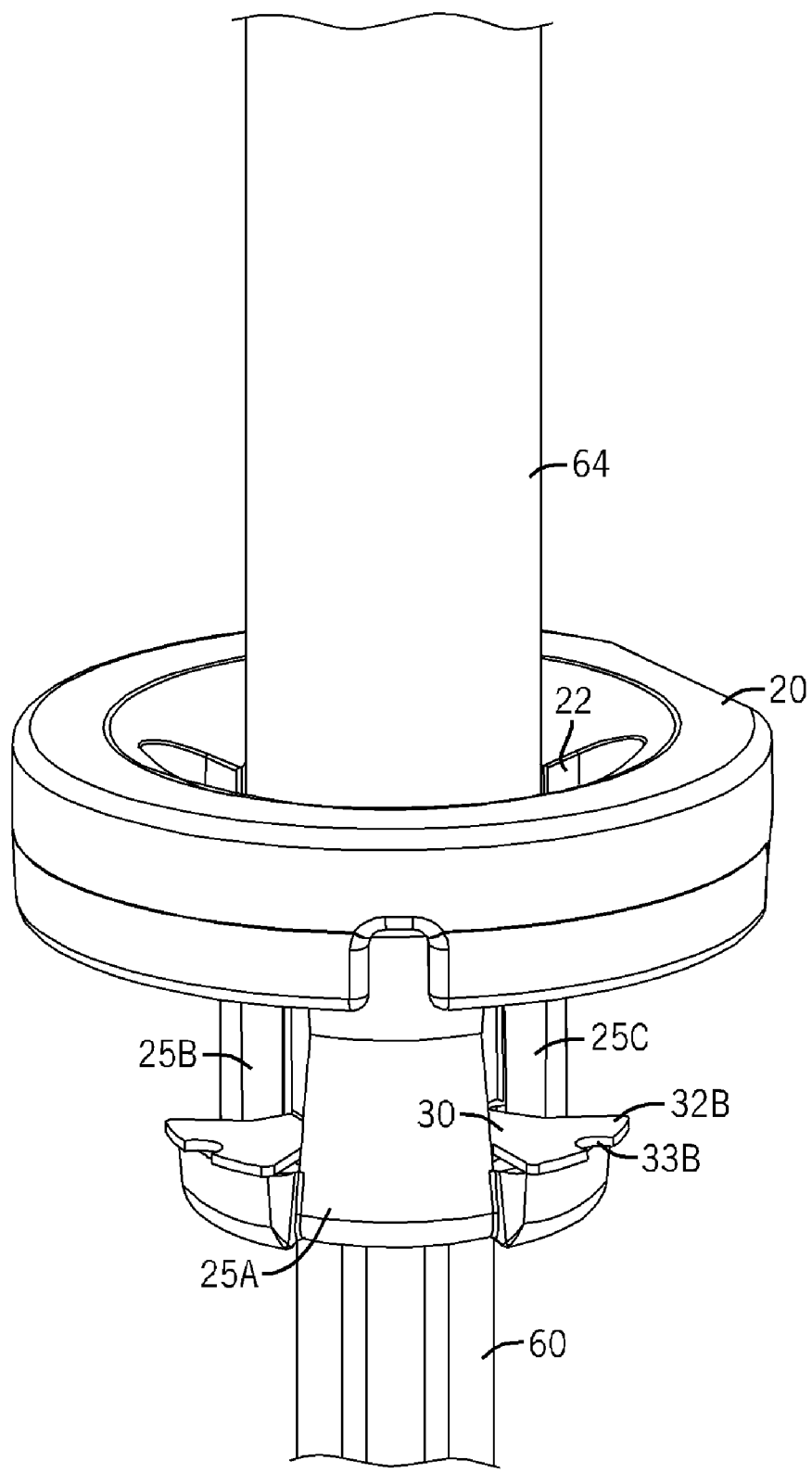
FIG. 9 is a side view showing assembly of a retainer clip into a socket in accordance with one embodiment of the present invention.

FIGS. 7-9 shows one method to assemble the clip 30 into the socket 20. A guide pin 60 is first inserted through the chamber 22 of the socket 20. Guide pin 60 has a triangular-shaped post 62 on the top end of the guide pin 60. Retainer clip 30 is then mounted onto the guide pin 60 by fitting a triangular-shaped hole 36 over the post 62. A push pin 64 with a triangular-shaped recess 66 matching the shape of the post is pushed onto the guide pin 60 and clip 30, sandwiching the clip 30 between the guide pin 60 and push pin 64 as seen in FIG. 8. The joined guide pin 60 and push pin 64 then continue to travel down the chamber 22 of the socket 20 and seat the clip 30 into the bottom potion 23 of the socket 20 (FIG. 9). As the clip 30 is seated into the socket 20, the tabs 34A, 34B, 34C are bent up as they contact the inside surface of socket legs 25A, 25B, 25C, then hook behind ledges 28. The guide pin 60 and push pin 64 are then removed from the socket assembly 10. The ledges 28 of each socket leg 25A, 25B, 25C hold the clip 30 securely into the socket 20 and prevent it from becoming dislodged. When the clip 30 is fully seated, the concave support surface 23A in the bottom portion 23 of the socket 20 angles the outer wings 32A, 32B, 32C slightly upward. A low insertion force of the socket assembly 10 into a boss 50 is allowed since the tabs 34A, 34B, 34C hold the inner portion of the clip 30 secure and allow the outer edge of wings 32A, 32B, 32C to flex upward unrestricted. Further, if pull out is attempted the outer edges 33A, 33B, 33C of wings 32A, 32B, 32C bite into the side wall of hole 52 of boss 50 and concave support surface 23A supports the wings 32A, 32B, 32C to resist buckling. The result of this combination is a high pull out resistance typically in excess of 450N. While current sockets which utilize metal retainer clips require air cylinders or power screw drivers with a screw-mounted socket design to install the clip, the socket assembly 10 of the present invention allows the option of hand assembly. Additionally, the assembly process that bends the clip 30 upon being seated into the socket 20 allows the clip 30 to be manufactured in the flat shape described above. As a result, bend angles of the clip 30 do not need to be controlled, oriented or measured. The flat-stamped clip 30 component saves time and cost in the manufacturing of the push-in socket assembly 10.

Figure 12:
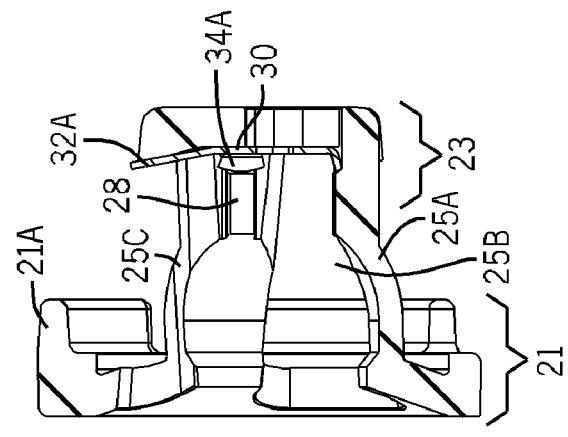
FIG. 12 is an exploded side view of a retainer clip, a socket and a ball stud in accordance with one embodiment of the present invention.

The flexion of the clip 30 upon insertion into the socket 20 is also advantageous for the insertion of the socket assembly 10 into a reflector boss 50. As seen in FIG. 12, after the clip 30 has been inserted into the socket 20 and the clip 30 is in a flexed position, the wings 32A, 32B, 32C are also bent upwards. As seen best in FIG. 14, when the socket 20 is inserted into the hole 52 of the reflector boss 50, the wings 32A, 32B, 32C are able to flex further to more vertical position as they bite into the inner walls of the reflector boss 50. The semicircular notches 33A, 33B, 33C in the wings 32A, 32B, 32C provide sharp corners which act to indent or "bite" into the side walls of the reflector boss 50 if removal of the socket assembly is 10 is attempted after it is assembled into the boss 50. The wings 32A, 32B, 32C thus fit securely against the walls of the hole 52 in the boss 50, while still allowing insertion of the socket 20 with a relatively small amount of push-in force required.

Figure 3A:
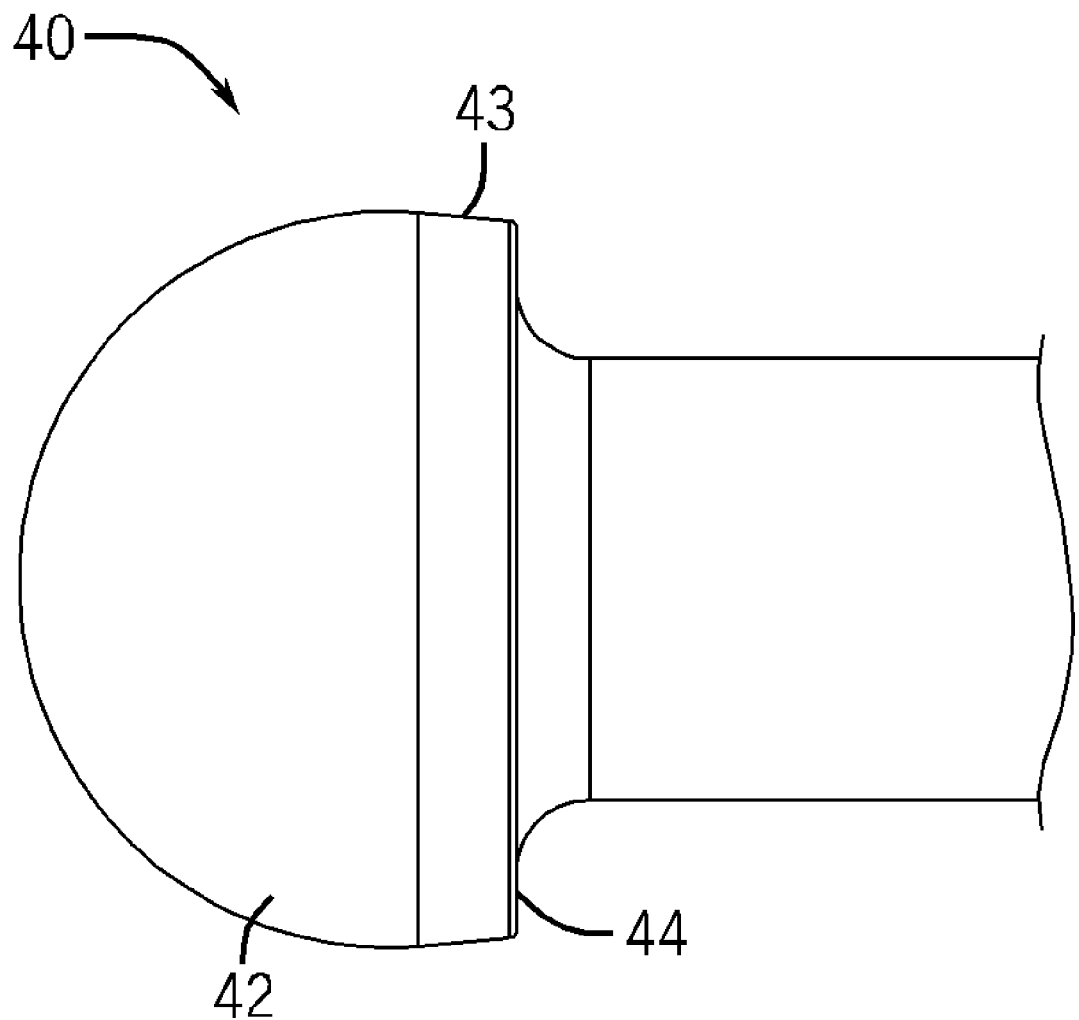
FIG. 3A is a detail side view of a ball stud in accordance with one embodiment of the present invention.

Assembly of the ball stud 40 into the socket 20 can done in several ways. In the traditional manner, sockets 10 are first installed into reflector bosses 50, and the reflector is then mounted to the ball studs within the headlamp assembly. Alternatively, as shown in FIGS. 11-14, the ball stud 40 can first be inserted into the socket 20, and then the entire socket assembly 10 (with ball stud 40) inserted into the reflector boss 50. As best seen in FIGS. 3A and 13, the lip 44 on the head 42 of the ball stud 40 can be designed such that the diameter of the outer edge of the lip 44 interferes and acts as a spring-centering or biasing feature against the angled surface on the undercut portion 24 of the socket 20. This biasing holds the axis of the socket 20 in line with the axis of the ball stud 40, allowing the socket 20 to maintain the proper alignment when it is inserted into the reflector boss 50 after being pre-assembled on the ball stud 40. Such an assembly method opens the possibility to reduce overall assembly costs for the headlamp assembler because it eliminates the assembly station normally needed for the reflector in order to pre-install the sockets. The flange 21A that surrounds the outside of the reflector boss 50 secures the top portion 21 to the outside of the boss 50 and allows clearance for the legs 25A, 25B, 25C to expand inside the boss hole 52 as the ball stud 40 is installed into the socket 20.

The use of the retainer clip 30 to secure the socket 20 into the boss and the angled position of the clip 30 that results from insertion of the clip 30 into the socket 20 and the socket 20 into the boss 50 also provides an additional advantage to the present invention. Unlike existing socket designs, the present invention allows the outer edge of the retainer clip 30 to easily flex upward for low installation force yet fully supports the retainer clip in the other direction clip to prevent pull out and secure the socket 20 into the hole 52 of the reflector boss 50. Existing designs provide for screw-mounted sockets (which require additional installation time and cost), or retainer clips that cannot easily flex during installation and scrape against the inner walls of the reflector boss during insertion, and therefore require a very high push-in force. Furthermore, existing non-screw-mounted designs provide for sockets which are snap-fit into reflector bosses, which require through holes for mounting that are not desired for the manufacturing reason previously mentioned. A push-in socket assembly 10 in accordance with the present invention includes a metal retainer clip 30 that freely bends in one direction for easy installation, yet is fully supported from flexing in the other direction for a secure fit and to prevent accidental pull-out from a reflector boss 50. Unlike existing designs, the socket 20 of the present invention can be both hand-assembled while providing significant resistance to accidental pull out. Another advantage to the push-in socket assembly 10 of the present invention is that the overall depth of the socket 20 is minimized by design and smaller in overall length than existing ball socket assemblies. The combination of having the retainer clip adjacent and just in front of ball stud and the concave support surface adjacent and just in front of the clip minimizes the fore/aft depth stack up from the pivot. This provides an advantage since the fore/aft depth of the socket directly affects overall depth of the headlamp and the depth of the headlamp often needs to be minimized to accommodate desired styling, optics and other components. Another advantage of the ball socket is that the molded socket 20 can be made in a two-plate mold that requires no side action. This reduces tooling cost and maintenance in the molding of the part.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A socket assembly comprising:
    a socket having top portion for receiving a ball stud, a bottom portion, and a plurality of legs connecting said top portion and said bottom portion, the plurality of legs forming a chamber in which said ball stud can move; and
    a retainer clip which can flex from a generally flat position, the retainer clip including one or more tabs for securing the retainer clip to the socket, and also including one or more wings, the wings allowing the retainer clip to bite against walls in a reflector of a headlamp housing to secure the socket to the reflector.

2. The socket assembly of claim 1, wherein the retainer clip is formed from a single stamping.

3. The socket assembly of claim 1 wherein the plurality of legs further include ledges under which tabs of retainer clip can be snap-fit for securing the retainer clip to the socket.

4. The socket assembly of claim 1 wherein the retainer clip is securely snap-fit into the socket using a steel pin.

5. The socket assembly of claim 1 wherein insertion of the retainer clip into the socket causes a first flexion of the retainer clip, and insertion of the socket into the reflector causes a further flexion as the wings bite against the walls of the reflector.

6. The socket assembly of claim 1 wherein the top portion of the socket includes a flat edge for orientation of the socket during assembly.

7. A headlamp assembly comprising:
    a reflector having a boss;
    a socket assembly secured to the reflector through the boss, the socket assembly comprising:
    a socket having a top portion for receiving a ball stud, a bottom portion, and a plurality of legs connecting said top portion and said bottom portion, the plurality of legs forming a chamber in which said ball stud can move; and
    a retainer clip which can flex from a generally flat position, the retainer clip including one or more tabs for securing the retainer clip to the socket, and also including one or more wings, the wings securing the socket to the reflector by allowing the retainer clip to bite against walls of the reflector when the socket is inserted through the boss.

8. The socket assembly of claim 7, wherein the retainer clip is formed from a single stamping.

9. The socket assembly of claim 7 wherein the plurality of legs further include ledges under which tabs of retainer clip can be snap-fit for securing the retainer clip to the socket.

10. The socket assembly of claim 7 wherein the retainer clip is securely snap-fit into the socket using a steel pin.

11. The socket assembly of claim 7 wherein insertion of the retainer clip into the socket causes a first flexion of the retainer clip, and insertion of the socket into the reflector causes a further flexion as the wings bite against the walls of the reflector.

12. The socket assembly of claim 7 wherein the top portion of the socket includes a flat edge for orientation of the socket during assembly.

13. A method of attaching a socket assembly to a reflector comprising the steps of:
    inserting a retainer clip through a boss in top portion of a socket and through a chamber formed by legs connecting top portion of socket to a bottom portion of socket;
    snap-fitting one or more tabs of retainer clip under ledges on the legs, causing flexion of the retainer clip;
    inserting the socket assembly into an aperture of a reflector, whereby one or more wings of the retainer clip bite against walls of the reflector to secure the socket to the reflector, causing further flexion of the retainer clip; and
    inserting a ball stud through the top portion of the socket into the chamber of the socket.

14. The method of claim 13 further comprising the step of further securing the retainer clip to the socket using a steel pin.

15. The method of claim 14 wherein the step of inserting a ball stud is performed before the step of inserting the socket assembly.

16. The method of claim 14 wherein the step of inserting a ball stud is performed after the step of inserting the socket assembly.

* * * * *